US012680826B2

(12) United States Patent
Abdossalami et al.

(10) Patent No.: US 12,680,826 B2
(45) Date of Patent: Jul. 14, 2026

(54) INFORMING VEHICLE OCCUPANTS ABOUT POINTS-OF-INTEREST

(71) Applicant: GM Global Technology Operations LLC, Detroit, MI (US)

(72) Inventors: Amin Abdossalami, Markham (CA); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 286 days.

(21) Appl. No.: 18/461,063

(22) Filed: Sep. 5, 2023

(65) Prior Publication Data

US 2025/0076072 A1      Mar. 6, 2025

(51) Int. Cl.
*G01C 21/36* (2006.01)
*G02B 27/01* (2006.01)
*G06F 3/01* (2006.01)
*G06Q 30/0201* (2023.01)

(52) U.S. Cl.
CPC ....... *G01C 21/3679* (2013.01); *G01C 21/365* (2013.01); *G02B 27/0179* (2013.01); *G06F 3/013* (2013.01); *G06Q 30/0201* (2013.01); *G02B 2027/0187* (2013.01)

(58) Field of Classification Search
CPC .............. G01C 21/3679; G01C 21/365; G02B 27/0179; G02B 2027/0187; G02B 27/01; G06F 3/013; G06Q 30/0201
See application file for complete search history.

(56) References Cited

U.S. PATENT DOCUMENTS

| | | | | |
|---|---|---|---|---|
| 2010/0253542 A1* | 10/2010 | Seder | .................... | G01S 13/931 |
| | | | | 340/425.5 |
| 2020/0410019 A1* | 12/2020 | Lenke | ................. | G06F 16/2379 |
| 2023/0258466 A1* | 8/2023 | Lee | ........................ | B60K 35/28 |
| | | | | 701/426 |
| 2024/0087561 A1* | 3/2024 | Pathak | .................... | G06F 3/013 |

* cited by examiner

*Primary Examiner* — Angela Y Ortiz
*Assistant Examiner* — Jack Robert Brewer
(74) *Attorney, Agent, or Firm* — Vivacqua Crane, PLLC

(57) ABSTRACT

A system for providing information to an occupant of a vehicle includes a global navigation satellite system (GNSS), a vehicle communication system, a display system configured to provide information to the occupant of the vehicle, and a vehicle controller in electrical communication with the GNSS, the vehicle communication system, and the display system. The vehicle controller is programmed to determine a location of the vehicle using the GNSS. The vehicle controller is further programmed to transmit the location of the vehicle to a remote server system using the vehicle communication system. The vehicle controller is further programmed to display a graphic using the display system. The graphic is received from the remote server system. The vehicle controller is further programmed to transmit an engagement metric of the graphic to the remote server system using the vehicle communication system.

9 Claims, 6 Drawing Sheets

INFORMING VEHICLE OCCUPANTS ABOUT POINTS-OF-INTEREST

INTRODUCTION

The present disclosure relates to an augmented reality head-up display for displaying information to an occupant of a vehicle.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the occupant's forward field of view. Accordingly, the head-up display provides occupants with information without looking away from the road. One possible implementation for augmented reality is an augmented reality head-up display (AR-HUD) for a vehicle. By overlaying images on the windscreen, AR-HUDs enhance an occupant's view of the environment outside the vehicle, creating a greater sense of environmental awareness. However, current AR-HUDs may not provide additional information about points-of-interest (POIs) in the environment surrounding the vehicle to occupants.

Therefore, while current augmented reality head-up displays achieve their intended purpose, there is a need in the art for an improved approach for providing information to vehicle occupants.

SUMMARY

According to several aspects, a system for providing information to an occupant of a vehicle is provided. The system may include a global navigation satellite system (GNSS), a vehicle communication system, a display system configured to provide information to the occupant of the vehicle, and a vehicle controller in electrical communication with the GNSS, the vehicle communication system, and the display system. The vehicle controller is programmed to determine a location of the vehicle using the GNSS. The vehicle controller is further programmed to transmit the location of the vehicle to a remote server system using the vehicle communication system. The vehicle controller is further programmed to display a graphic using the display system. The graphic is received from the remote server system. The vehicle controller is further programmed to transmit an engagement metric of the graphic to the remote server system using the vehicle communication system.

In another aspect of the present disclosure, the engagement metric includes at least an impression metric. To transmit the engagement metric, the vehicle controller is further programmed to determine the impression metric. The impression metric is a binary true or false value. To transmit the engagement metric, the vehicle controller is further programmed to transmit the impression metric to the remote server system using the vehicle communication system.

In another aspect of the present disclosure, the system further includes an occupant position tracking device. To determine the impression metric, the vehicle controller is further programmed to determine a gaze direction of the occupant using the occupant position tracking device. The gaze direction includes one of: a graphic gaze direction and a non-graphic gaze direction. To determine the impression metric, the vehicle controller is further programmed to determine a gaze time of the occupant in response to determining that the gaze direction is the graphic gaze direction. To determine the impression metric, the vehicle controller is further programmed to compare the gaze time of the occupant to a predetermined gaze time threshold. To determine the impression metric, the vehicle controller is further programmed to determine the impression metric to be true in response to determining that the gaze time of the occupant is greater than or equal to the predetermined gaze time threshold. To determine the impression metric, the vehicle controller is further programmed to determine the impression metric to be false in response to determining that the gaze time of the occupant is less than the predetermined gaze time threshold.

In another aspect of the present disclosure, the remote server system includes a server communication system and a server database in electrical communication with a server controller. The server database includes a plurality of database records. Each of the plurality of database records includes a graphic display location, a point-of-interest (POI) location, and a POI graphic. The server controller is programmed to receive the location of the vehicle using the server communication system. The server controller is further programmed to select the graphic based at least in part on the location of the vehicle. The server controller is further programmed to transmit the graphic to the vehicle communication system using the server communication system. The server controller is further programmed to receive the impression metric using the server communication system and store the impression metric in the server database.

In another aspect of the present disclosure, to select the graphic, the server controller is further programmed to select a first of the plurality of database records. The location of the vehicle is within the graphic display location of the first of the plurality of database records. To select the graphic, the server controller is further programmed to select the graphic. The graphic is the POI graphic from the first of the plurality of database records.

In another aspect of the present disclosure, to receive the impression metric, the server controller is further programmed to receive the impression metric using the server communication system and store the impression metric in the server database. To receive the impression metric, the server controller is further programmed to determine a closure metric in response to determining that the impression metric is true. The closure metric is a binary true or false value. To receive the impression metric, the server controller is further programmed to store the closure metric in the server database.

In another aspect of the present disclosure, to determine the closure metric, the server controller is further programmed to compare the location of the vehicle to the POI location of the first of the plurality of database records. To determine the closure metric, the server controller is further programmed to determine the closure metric to be true in response to determining that the location of the vehicle is within the POI location of the first of the plurality of database records.

In another aspect of the present disclosure, the display system includes an augmented reality head-up display (AR-HUD) system in electrical communication with the vehicle controller. The AR-HUD system includes an occupant position tracking device and an AR-HUD projector. To display the graphic, the vehicle controller is further programmed to determine a position of the occupant using the occupant position tracking device. To display the graphic, the vehicle controller is further programmed to calculate a size, shape, and location of the graphic based on the position of the occupant. To display the graphic, the vehicle controller is further programmed to display the graphic on a windscreen of the vehicle using the augmented reality head up display system based on the size, shape, and location.

In another aspect of the present disclosure, the display system further includes a transparent windscreen display (TWD) system in electrical communication with the vehicle controller. The transparent windscreen display system includes transparent phosphors embedded in the windscreen of the vehicle and a TWD projector. To display the graphic, the vehicle controller is further programmed to display the graphic on the windscreen of the vehicle using the TWD system based on the size, shape, and location.

In another aspect of the present disclosure, the display system further includes a human-machine interface (HMI) in electrical communication with the vehicle controller. To display the graphic, the vehicle controller is further programmed to display the graphic using the HMI.

According to several aspects, a method for providing information to an occupant of a vehicle is provided. The method may include determining a location of the vehicle using a global navigation satellite system (GNSS). The method further may include determining a graphic based at least in part on the location of the vehicle. The method further may include displaying the graphic using a display system. The method further may include determining an engagement metric of the occupant with the graphic.

In another aspect of the present disclosure, determining the graphic further may include selecting a first of a plurality of database records. Each of the plurality of database records includes a graphic display location, a point-of-interest (POI) location, and a POI graphic. The location of the vehicle is within the graphic display location of the first of the plurality of database records. Determining the graphic further may include determining the graphic, where graphic is the POI graphic from the first of the plurality of database records.

In another aspect of the present disclosure, the engagement metric includes at least an impression metric. The impression metric is a binary true or false value. Determining the engagement metric further may include determining a gaze direction of the occupant using an occupant position tracking device. The gaze direction includes one of: a graphic gaze direction and a non-graphic gaze direction. Determining the engagement metric further may include determining a gaze time of the occupant in response to determining that the gaze direction is the graphic gaze direction. Determining the engagement metric further may include comparing the gaze time of the occupant to a predetermined gaze time threshold. Determining the engagement metric further may include determining the impression metric to be true in response to determining that the gaze time of the occupant is greater than or equal to the predetermined gaze time threshold. Determining the engagement metric further may include determining the impression metric to be false in response to determining that the gaze time of the occupant is less than the predetermined gaze time threshold.

In another aspect of the present disclosure, determining the engagement metric further may include determining a closure metric in response to determining that the impression metric is true. The closure metric is a binary true or false value.

In another aspect of the present disclosure, determining the closure metric further may include comparing the location of the vehicle to the POI location of the first of the plurality of database records. Determining the closure metric further may include determining the closure metric to be true in response to determining that the location of the vehicle is within the POI location of the first of the plurality of database records.

In another aspect of the present disclosure, the display system includes an augmented reality head-up display (AR-HUD) system. The AR-HUD system includes an occupant position tracking device and an AR-HUD projector. Displaying the graphic further may include determining a position of the occupant using the occupant position tracking device. Displaying the graphic further may include calculating a size, shape, and location of the graphic based on the position of the occupant. Displaying the graphic further may include displaying the graphic on a windscreen of the vehicle using the augmented reality head up display system based on the size, shape, and location.

In another aspect of the present disclosure, the display system further includes a transparent windscreen display (TWD) system. The transparent windscreen display system includes transparent phosphors embedded in the windscreen of the vehicle and a TWD projector. Displaying the graphic further may include displaying the graphic on the windscreen of the vehicle using the TWD system based on the size, shape, and location.

According to several aspects, a system for providing information to an occupant of a vehicle is provided. The system may include a global navigation satellite system (GNSS), a vehicle communication system, and a display system configured to provide information to the occupant of the vehicle. The display system includes an augmented reality head-up display (AR-HUD) system. The AR-HUD system includes an occupant position tracking device and an AR-HUD projector. The system further may include a vehicle controller in electrical communication with the GNSS, the vehicle communication system, and the display system. The vehicle controller is programmed to determine a location of the vehicle using the GNSS. The vehicle controller is further programmed to transmit the location of the vehicle to a remote server system using the vehicle communication system. The vehicle controller is further programmed to receive a graphic from the remote server system. The vehicle controller is further programmed to determine a position of the occupant using the occupant position tracking device. The vehicle controller is further programmed to calculate a size, shape, and location of the graphic based on the position of the occupant. The vehicle controller is further programmed to display the graphic on a windscreen of the vehicle using the augmented reality head up display system based on the size, shape, and location. The vehicle controller is further programmed to transmit an impression metric of the graphic to the remote server system using the vehicle communication system.

In another aspect of the present disclosure, to transmit the impression metric, the vehicle controller is further programmed to determine a gaze direction of the occupant using the occupant position tracking device. The gaze direction includes one of: a graphic gaze direction and a non-graphic gaze direction. To transmit the impression metric, the vehicle controller is further programmed to determine a gaze time of the occupant in response to determining that the gaze direction is the graphic gaze direction. To transmit the impression metric, the vehicle controller is further programmed to compare the gaze time of the occupant to a predetermined gaze time threshold. To transmit the impression metric, the vehicle controller is further programmed to determine the impression metric to be true in response to determining that the gaze time of the occupant is greater than or equal to the predetermined gaze time threshold. To transmit the impression metric, the vehicle controller is further programmed to determine the impression metric to be false in response to determining that the gaze time of the occupant is less than the predetermined gaze time threshold. To transmit the impression metric, the vehicle controller is further programmed to transmit the impression metric to the remote server system using the vehicle communication system.

In another aspect of the present disclosure, the remote server system includes a server communication system and a server database in electrical communication with a server controller. The server database includes a plurality of database records. Each of the plurality of database records includes a graphic display location, a point-of-interest (POI) location, and a POI graphic. The server controller is programmed to receive the location of the vehicle using the server communication system. The server controller is further programmed to select a first of the plurality of database records. The location of the vehicle is within the graphic display location of the first of the plurality of database records. The server controller is further programmed to select the graphic. The graphic is the POI graphic from the first of the plurality of database records. The server controller is further programmed to transmit the graphic to the vehicle communication system using the server communication system. The server controller is further programmed to receive the impression metric using the server communication system and store the impression metric in the server database. The server controller is further programmed to compare the location of the vehicle to the POI location of the first of the plurality of database records in response to determining that the impression metric is true. The server controller is further programmed to determine a closure metric to be true in response to determining that the location of the vehicle is within the POI location of the first of the plurality of database records.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When driving, vehicle occupants may desire to receive information about points-of-interest (POIs) in the environment surrounding the vehicle. However, looking away from the roadway to receive information may decrease occupant awareness. Therefore, the present disclosure provides a new and improved system and method for providing information about POIs to an occupant of a vehicle.

Figure 1:
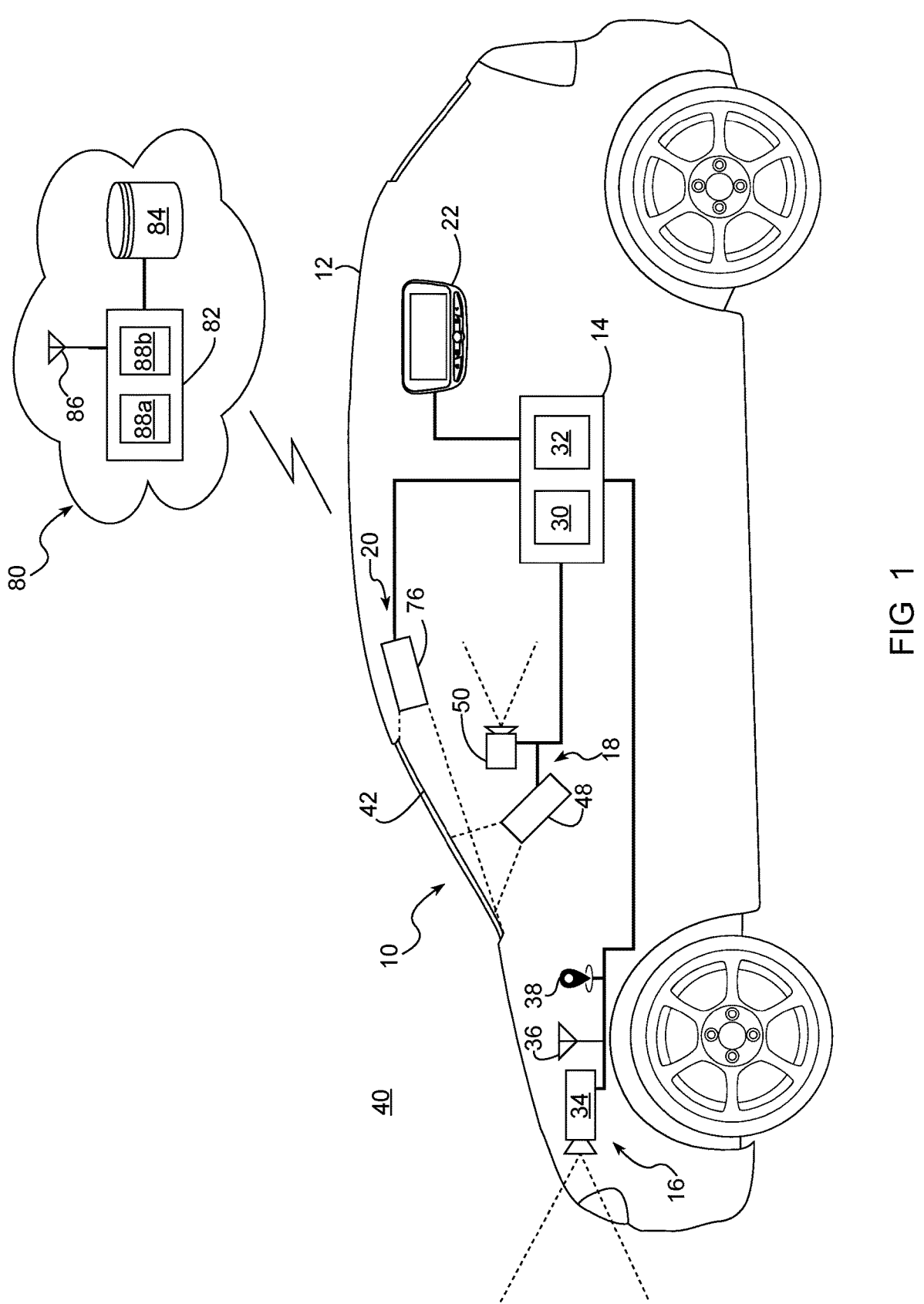
FIG. 1 is a schematic diagram of a system for providing information to an occupant of a vehicle, according to an exemplary embodiment.

Referring to FIG. 1, a system for providing information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a plurality of vehicle sensors 16, an augmented reality head-up display (AR-HUD) system 18, a transparent windscreen display (TWD) system 20, and a human-machine interface (HMI) 22.

The vehicle controller 14 is used to implement a method 100 for providing information to an occupant of a vehicle, as will be described below. The vehicle controller 14 includes at least one processor 30 and a non-transitory computer readable storage device or media 32. The processor 30 may be a custom made or commercially available processor, a central processing unit (CPU), a graphics processing unit (GPU), an auxiliary processor among several processors associated with the vehicle controller 14, a semi-conductor-based microprocessor (in the form of a microchip or chip set), a macroprocessor, a combination thereof, or generally a device for executing instructions. The computer readable storage device or media 32 may include volatile and nonvolatile storage in read-only memory (ROM), random-access memory (RAM), and keep-alive memory (KAM), for example. KAM is a persistent or non-volatile memory that may be used to store various operating variables while the processor 30 is powered down. The computer-readable storage device or media 32 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the plurality of vehicle sensors 16, the augmented reality head-up display (AR-HUD) system 18, the transparent windscreen display (TWD) system 20, and the human-machine interface (HMI) 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The plurality of vehicle sensors 16 are used to acquire information relevant to the vehicle 12. In an exemplary embodiment, the plurality of vehicle sensors 16 includes at least a camera system 34, a vehicle communication system 36, and a global navigation satellite system (GNSS) 38.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about an environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about an environment 40 surrounding the vehicle 12. In a non-limiting example, the plurality of vehicle sensors 16 further includes at least one of an ambient air temperature sensor, a barometric pressure sensor, and/or a photo and/or video camera which is positioned to view the environment 40 in front of the vehicle 12.

In another exemplary embodiment, at least one of the plurality of vehicle sensors 16 is a perception sensor capable of perceiving objects and/or measuring distances in the environment 40 surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen 42 of the vehicle 12. In another example, at least one of the plurality of vehicle sensors 16 is affixed outside of the vehicle 12, for example, on a roof of the vehicle 12, having a view of the environment 40 surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 16 are in electrical communication with the vehicle controller 14 as discussed above.

The camera system 34 is a perception sensor used to capture images and/or videos of the environment 40 surrounding the vehicle 12. In an exemplary embodiment, the camera system 34 includes a photo and/or video camera which is positioned to view the environment 40 surrounding the vehicle 12. In a non-limiting example, the camera system 34 includes a camera affixed inside of the vehicle 12, for example, in a headliner of the vehicle 12, having a view through the windscreen 42. In another non-limiting example, the camera system 34 includes a camera affixed outside of the vehicle 12, for example, on a roof of the vehicle 12, having a view of the environment 40 in front of the vehicle 12.

In another exemplary embodiment, the camera system 34 is a surround view camera system including a plurality of cameras (also known as satellite cameras) arranged to provide a view of the environment 40 adjacent to all sides of the vehicle 12. In a non-limiting example, the camera system 34 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 34 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 38 is used to determine a geographical location of the vehicle 12. In an exemplary embodiment, the GNSS 38 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 38 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 38. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 38 may be integrated with the vehicle controller 14 (e.g., on a same circuit board with the vehicle controller 14 or otherwise a part of the vehicle controller 14) without departing from the scope of the present disclosure.

Figure 2:
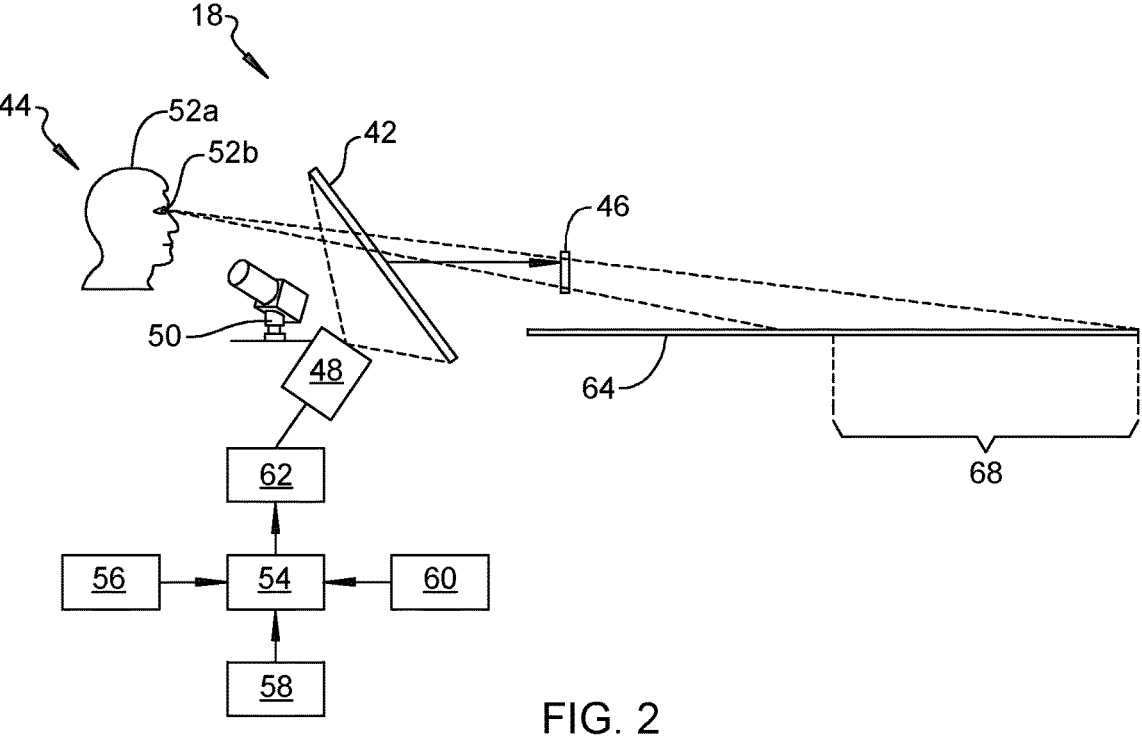
FIG. 2 is a schematic diagram of an AR-HUD system for use by an exemplary occupant, according to an exemplary embodiment.

Referring to FIG. 2, a system diagram of the AR-HUD system 18 for use by an exemplary occupant 44 is shown. In the scope of the present disclosure, the occupant 44 includes, in a non-limiting example, a driver, a passenger, and/or any additional persons in the vehicle 12. The AR-HUD system 18 is used to display AR-HUD graphics 46 (i.e., notification symbols providing visual information to the occupant 44) on the windscreen 42 of the vehicle 12. The AR-HUD system 18 includes an AR-HUD projector 48 and an occupant position tracking device 50. The AR-HUD system 18 is in electrical communication with the vehicle controller 14 as discussed above.

The AR-HUD projector 48 is used to project the AR-HUD graphics 46 on the windscreen 42 of the vehicle 12. It should be understood that various devices designed to project images including, for example, optical collimators, laser projectors, digital light projectors (DLP), and the like are within the scope of the present disclosure.

The occupant position tracking device 50 is used to determine a position of the occupant 44 in the vehicle 12. For example, the occupant position tracking device 50 may track a position of a head 52a or eyes 52b of the occupant 44. The position of the occupant 44 in the vehicle 12 from the occupant position tracking device 50 is used to locate the AR-HUD graphic 46 on the windscreen 42 of the vehicle 12. In an exemplary embodiment, the occupant position tracking device 50 is one or more cameras disposed in the vehicle 12.

To operate the AR-HUD system 18, the vehicle controller 14 includes multiple software modules, including a system manager 54. During operation of the AR-HUD system 18, the system manager 54 receives at least a first input 56, a second input 58, and a third input 60. The first input 56 is indicative of the location of the vehicle 12 in space (i.e., the geographical location of the vehicle 12), the second input 58 is indicative of the occupant 44 position in the vehicle 12 (e.g., the position of the head 52a and/or eyes 52b of the occupant 44 in the vehicle 12), and the third input 60 is data pertaining to a point-of-interest (POI), as will be discussed in greater detail below. The first input 56 may include data such as GNSS data (e.g., GPS data), vehicle speed, roadway curvature, and vehicle steering, and this data is collected from the plurality of vehicle sensors 16. The second input 58 is received from the occupant position tracking device 50. The third input 60 is data pertaining to the POI. The system manager 54 is configured to determine (e.g., compute) the type, size, shape, and color of the AR-HUD graphics 46 to be displayed using the AR-HUD projector 48 based on the first input 56 (i.e., the vehicle location in the environment 40), the second input 58 (e.g., the position of the eyes 52b and/or head 52a of the occupant 44 in the vehicle 12), and the third input 60 (i.e. the data pertaining to the POI). The system manager 54 instructs an image engine 62, which is a software module or an integrated circuit of the AR-HUD projector 48 or the vehicle controller 14, to display the AR-HUD graphic 46 using the AR-HUD projector 48. The image engine 62 displays the AR-HUD graphic 46 on the windscreen 42 of the vehicle 12 using the AR-HUD projector 48 based on the type, size, shape, and color of the AR-HUD graphic 46 determined by the system manager 54. The AR-HUD graphic 46 is projected on the windscreen 42 by the AR-HUD projector 48 to show the AR-HUD graphic 46 along a roadway surface 64.

Figure 3:
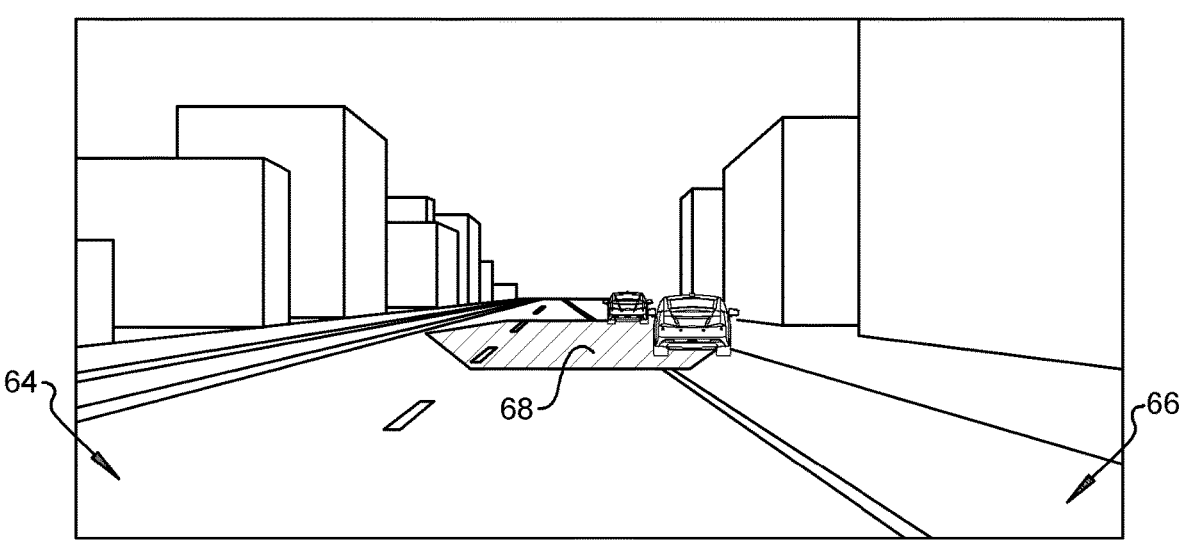
FIG. 3 is a schematic front view of a dual-focal plane augmented reality display, highlighting a second image plane of the dual-focal plane augmented reality display, according to an exemplary embodiment.
Figure 4:
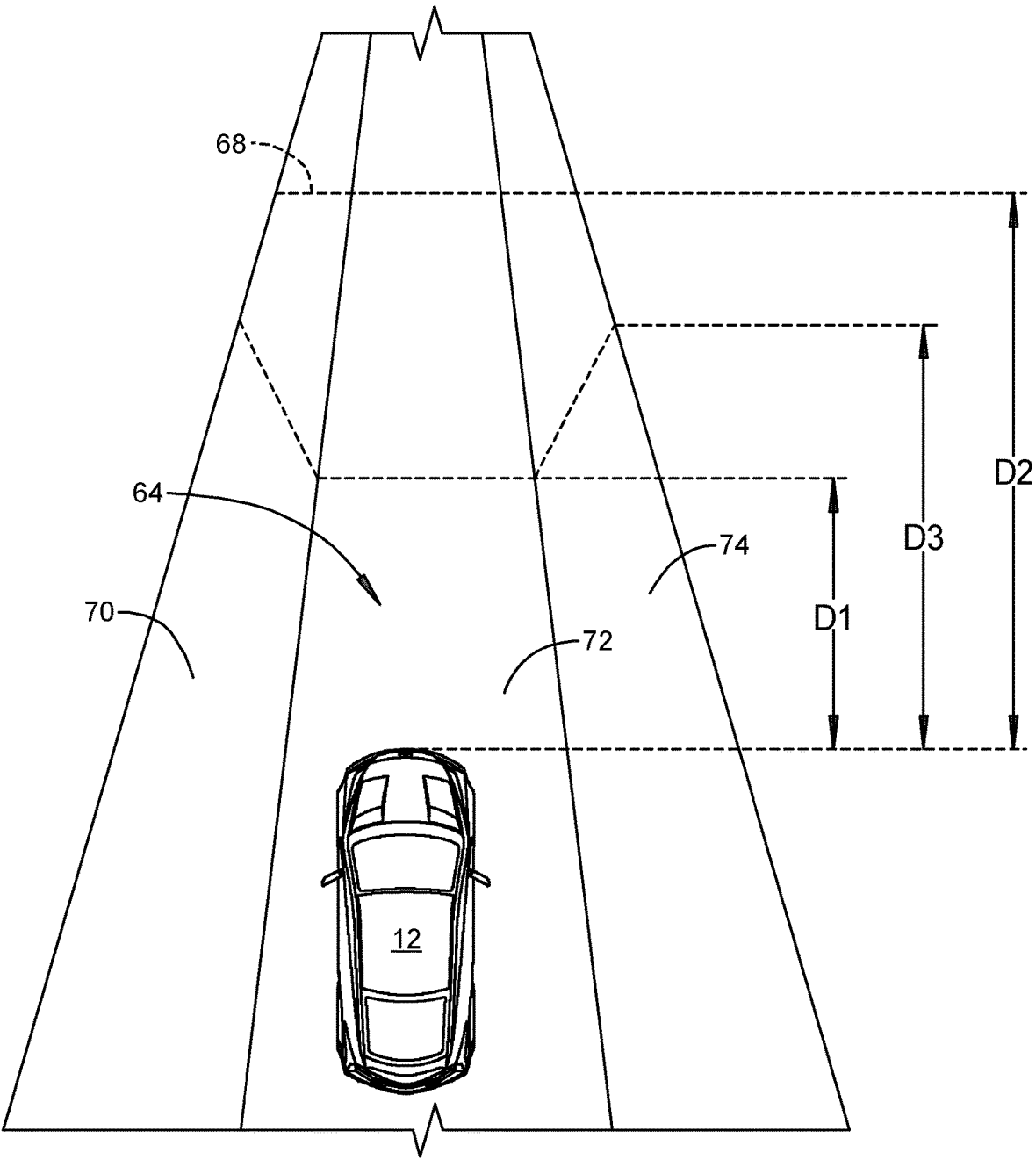
FIG. 4 is a schematic diagram of the second image plane of the dual-focal plane augmented reality display, according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 66 and a second image plane 68. The first image plane 66 shows the view of the outside world, and the second image plane 68 is reserved for displaying the AR-HUD graphics 46. The second image plane 68 spans multiple lanes and the AR-HUD graphics 46 appear at a location farther on a roadway surface 64 relative to the first image plane 66. For instance, as shown in FIGS. 3 and 4, the second image plane 68 covers a left lane 70, a central lane 72, and a right lane 74. As a non-limiting example, in the central lane 72, the second image plane 68 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 44 see the AR-HUD graphics 46 displayed using the AR-HUD projector 48. In the left lane 70 and the right lane 74, the second image plane 68 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 44 see the AR-HUD graphics 46 displayed using the AR-HUD projector 48. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 46 on the view of the outside world. For instance, by using a dual-focal plane AR-HUD, the size, location, and characteristics of the AR-HUD graphics 46 may be changed based on, for example, the location of the eyes 52b of the occupant 44.

The TWD system 20 is used to display images on the windscreen 42 of the vehicle 12. In an exemplary embodiment, the AR-HUD system 18 can display the AR-HUD graphics 46 in a predefined region of the windscreen 42 (e.g., in the first image plane 66 and the second image plane 68). The TWD system 20 can display TWD graphics (not shown) in any region of the windscreen 42. Therefore, by operating the AR-HUD system 18 and the TWD system 20 in conjunction, the vehicle controller 14 may display graphics in any region of the windscreen 42. In an exemplary embodiment, the TWD system 20 includes transparent phosphors (not shown) embedded into the windscreen 42 and a TWD projector 76 (FIG. 1). The TWD system 20 is in electrical communication with the vehicle controller 14 as discussed above.

The transparent phosphors are light emitting particles which fluoresce in response to being excited by the TWD projector 76. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 76 is used to excite the transparent phosphors in a predetermined pattern to produce the TWD graphics on the windscreen 42. In an exemplary embodiment, the TWD projector 76 is a violet/ultraviolet laser projector disposed proximally to the headliner of the vehicle 12. The TWD projector 76 includes three lasers, each laser configured to excite one of the red, green, or blue transparent phosphors.

In an exemplary embodiment, the HMI 22 is used in addition to the AR-HUD system 18 and the TWD system 20 to display information to the occupant 44 of the vehicle 12. In another exemplary embodiment, the HMI 22 is used instead of the AR-HUD system 18 and/or the TWD system 20 to display information to the occupant 44 of the vehicle 12. In the aforementioned exemplary embodiments, the HMI 22 is a display located in view of the occupant 44 and capable of displaying text, graphics, and/or images. It is to be understood that HMI displays including LCD displays, LED displays, and the like are within the scope of the present disclosure. Further exemplary embodiments where the HMI 22 is disposed in a rearview mirror are also within the scope of the present disclosure. The HMI 22 is in electrical communication with the vehicle controller 14 as discussed above.

Referring again to FIG. 1, a remote server system is illustrated and generally indicated by reference number 80. The remote server system 80 includes a server controller 82 in electrical communication with a server database 84 and a server communication system 86. In a non-limiting example, the remote server system 80 is located in a server farm, datacenter, or the like, and connected to the internet.

The server controller 82 includes at least one server processor 88*a* and a server non-transitory computer readable storage device or server media 88*b*. The description of the type and configuration given above for the vehicle controller 14 also applies to the server controller 82. In some examples, the server controller 82 may differ from the vehicle controller 14 in that the server controller 82 is capable of a higher processing speed, includes more memory, includes more inputs/outputs, and/or the like. In a non-limiting example, the server processor 88*a* and server media 88*b* of the server controller 82 are similar in structure and/or function to the processor 30 and the media 32 of the vehicle controller 14, as described above.

The server database 84 is used to store information about points-of-interest (POIs). In an exemplary embodiment, the server database 84 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 82 may execute software such as, for example, a database management system (DBMS), allowing data stored on the one or more mass storage devices to be organized and accessed.

In an exemplary embodiment, the server database 84 is populated with a plurality of database records. Each of the plurality of database records includes a graphic display location, a point-of-interest (POI) location, and a POI graphic. The graphic display location is a location in the environment 40. In a non-limiting example, the graphic display location is a point location. In another non-limiting example, the graphic display location is a geofenced two-dimensional area (e.g., a section of a roadway, a parking lot, and/or the like). In another non-limiting example, the graphic display location is a geofenced three-dimensional area. The POI location is a location of a point-of-interest in the environment 40. In the scope of the present disclosure, a point-of-interest (POI) is a specific point location in the environment 40 that the occupant 44 may find useful or interesting, including, for example, a business, a restaurant, a vehicle service center, a hospital, a police station, a gas station, a vehicle charging station, a recreational area, a nature preserve area, a museum, a theater, and/or the like. The POI graphic is a graphic to be displayed when the vehicle 12 is within the graphic display location. In a non-limiting example, the graphic provides information related to the POI location, for example, opening hours, product/service availability, advertising promotions, and/or the like. In a non-limiting example, the POI graphic is predetermined and loaded into the server database 84. In another non-limiting example, the server controller 82 uses the server communication system 86 (e.g., by connection to the internet) to periodically retrieve current information (e.g., updated opening hours) about POIs and saves the current information in the POI graphic field of each of the plurality of database records.

The server communication system 86 is used to communicate with external systems, such as, for example, the vehicle controller 14 via the vehicle communication system 36. In a non-limiting example, server communication system 86 is similar in structure and/or function to the vehicle communication system 36, as described above. In some examples, the server communication system 86 may differ from the vehicle communication system 36 in that the server communication system 86 is capable of higher power signal transmission, more sensitive signal reception, higher bandwidth transmission, additional transmission/reception protocols, and/or the like.

Figure 5:
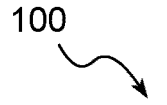
FIG. 5 is a flowchart of a method for providing information to the occupant of the vehicle, according to an exemplary embodiment.
Figure 5:
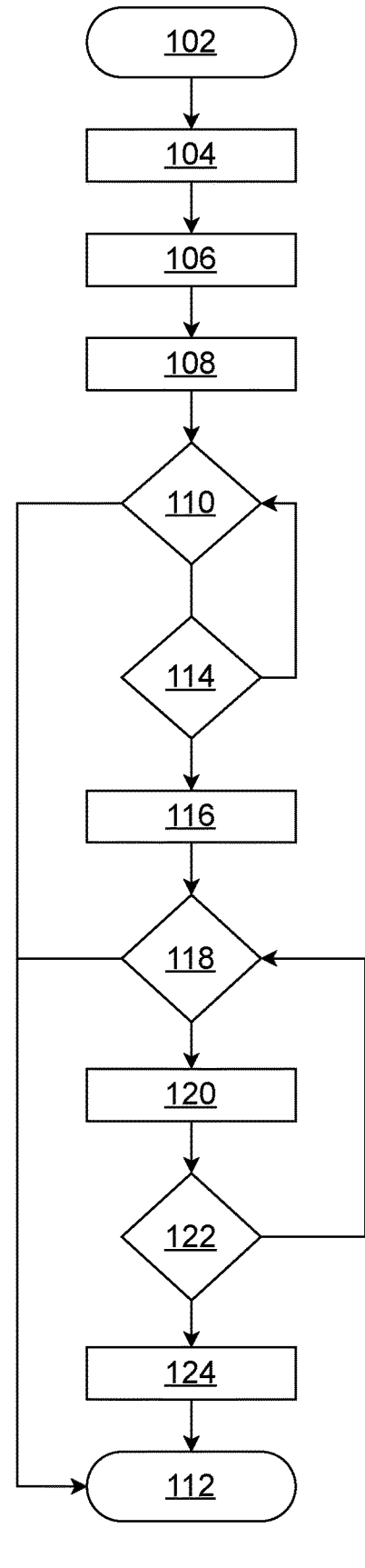

Referring to FIG. 5, a flowchart of the method 100 for providing information to the occupant of the vehicle is provided. The method 100 begins at block 102 and proceeds to block 104. At block 104, the vehicle controller 14 uses the GNSS 38 to determine a location of the vehicle 12. The vehicle controller 14 then uses the vehicle communication system 36 to transmit the location of the vehicle 12 to the remote server system 80. After block 104, the method 100 proceeds to block 106. At block 106, the remote server system 80 receives the location of the vehicle 12 using the server communication system 86 and selects a graphic for display by the vehicle 12 based at least in part on the location of the vehicle 12.

In an exemplary embodiment, to select the graphic, the server controller 82 searches the plurality of database records stored in the server database 84 based on the location of the vehicle 12. The server controller 82 identifies a first of the plurality of database records, where the first of the plurality of database records has a graphic display location including the location of the vehicle 12 (i.e., the location of the vehicle 12 is within the graphic display location of the first of the plurality of database records). The graphic is selected to be the POI graphic of the first of the plurality of database records. The server controller 82 then uses the server communication system 86 to transmit the POI graphic of the first of the plurality of database records to the vehicle controller 14. After block 106, the method 100 proceeds to block 108.

At block 108, the vehicle controller 14 receives the graphic using the vehicle communication system 36 and displays the graphic using a display system. In an exemplary embodiment, the display system includes at least one of: the AR-HUD system 18, the TWD system 20, and the HMI 22. To display the graphic, the vehicle controller 14 first determines the position of the occupant 44 using the occupant position tracking device 50, as discussed above. After determining the position of the occupant 44, the vehicle controller 14 calculates the size, shape, and location of the graphic, as discussed above.

After calculating the size, shape, and location of the graphic, the vehicle controller 14 displays the graphic using at least one of the AR-HUD system 18 and the TWD system 20, as discussed above. In an exemplary embodiment, the vehicle controller 14 additionally uses the HMI 22 to provide an augmented view of the environment 40 surrounding the vehicle 12 including the graphic.

In an exemplary embodiment, the graphic may be selectively displayed based on one or more vehicle states or vehicle conditions. In the scope of the present disclosure, the one or more vehicle states or vehicle conditions includes, for example, a location of the vehicle 12, an environmental condition surrounding the vehicle 12, an occupant status in the vehicle 12, and/or the like. In a non-limiting example, the graphic is selectively displayed based on a roadway upon which the vehicle 12 is travelling (e.g., the graphic is only displayed on highways, primary road classes, and/or straight road segments). In another non-limiting example, the graphic is selectively displayed based on an attention level of the occupant 44 (e.g., the graphic is only displayed if gaze profile data of the occupant 44 indicates that the occupant 44 is not busy looking at vehicle traffic, impaired, distracted, or fatigued).

In another non-limiting example, the graphic is selectively displayed based on traffic conditions surrounding the vehicle 12 (e.g., the graphic is only displayed in free-flowing traffic conditions, and the graphic is not displayed when the vehicle 12 is within a construction zone). In another non-limiting example, the graphic is selectively displayed based on weather conditions surrounding the vehicle 12 (e.g., the graphic is only displayed during dry ambient weather conditions). In another non-limiting example, the graphic is selectively displayed based on an automated driving status of the vehicle 12 (e.g., the graphic is only displayed if the vehicle 12 is operating in a Level 2 or higher automated driving state).

In another non-limiting example, the graphic is selectively displayed based on vehicle maneuvering status (e.g., the graphic is not displayed during active vehicle maneuvers, when a turn signal is active, when a turn is in progress, when a lane change is in progress, and/or the like). In another non-limiting example, the graphic is selectively displayed based on a traffic control status of the vehicle 12 (e.g., the graphic is only displayed when the vehicle 12 is in an active traffic control situation, for example, when the vehicle 12 is stopped at a red light with a predetermined minimum time remaining in the traffic phase).

In another non-limiting example, the graphic is selectively displayed based on a diagnostic state of the vehicle 12 (e.g., the graphic is not displayed if the vehicle 12 is malfunctioning, for example, if low tire pressure is detected, a malfunction indicator lamp is activated, and/or the like). In another non-limiting example, the graphic is selectively displayed based on occupant type (e.g., the graphic is not displayed to occupants under a certain age, the graphic is not displayed to commercial/fleet occupants, and/or the like).

In a non-limiting example, the one or more vehicle states or vehicle conditions are determined by the vehicle controller 14 using the plurality of vehicle sensors 16. It should be understood that the aforementioned one or more vehicle states or vehicle conditions are merely exemplary in nature, and that the graphics may be selectively displayed at block 108 based on additional factors without departing from the scope of the present disclosure. After block 108, the method 100 proceeds to block 110.

Figure 6:
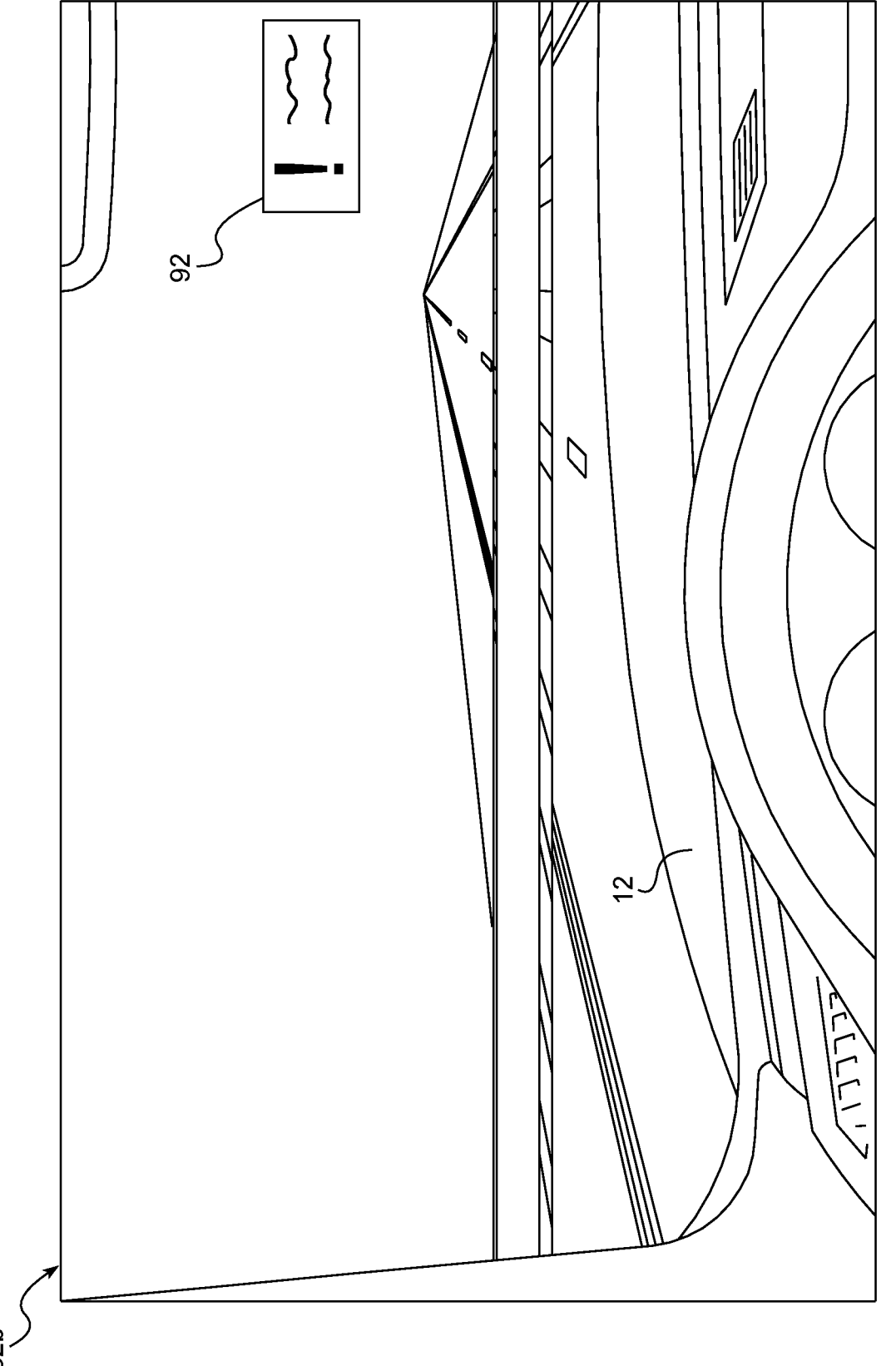
FIG. 6 is a first exemplary view through a windscreen of the vehicle, according to an exemplary embodiment.

Referring to FIG. 6, a first exemplary view 90*a* through the windscreen 42 of the vehicle 12 is shown. The first exemplary view 90*a* includes a first exemplary graphic 92. In a non-limiting example, the first exemplary graphic 92 includes text and/or images providing information about the POI location.

Figure 7:
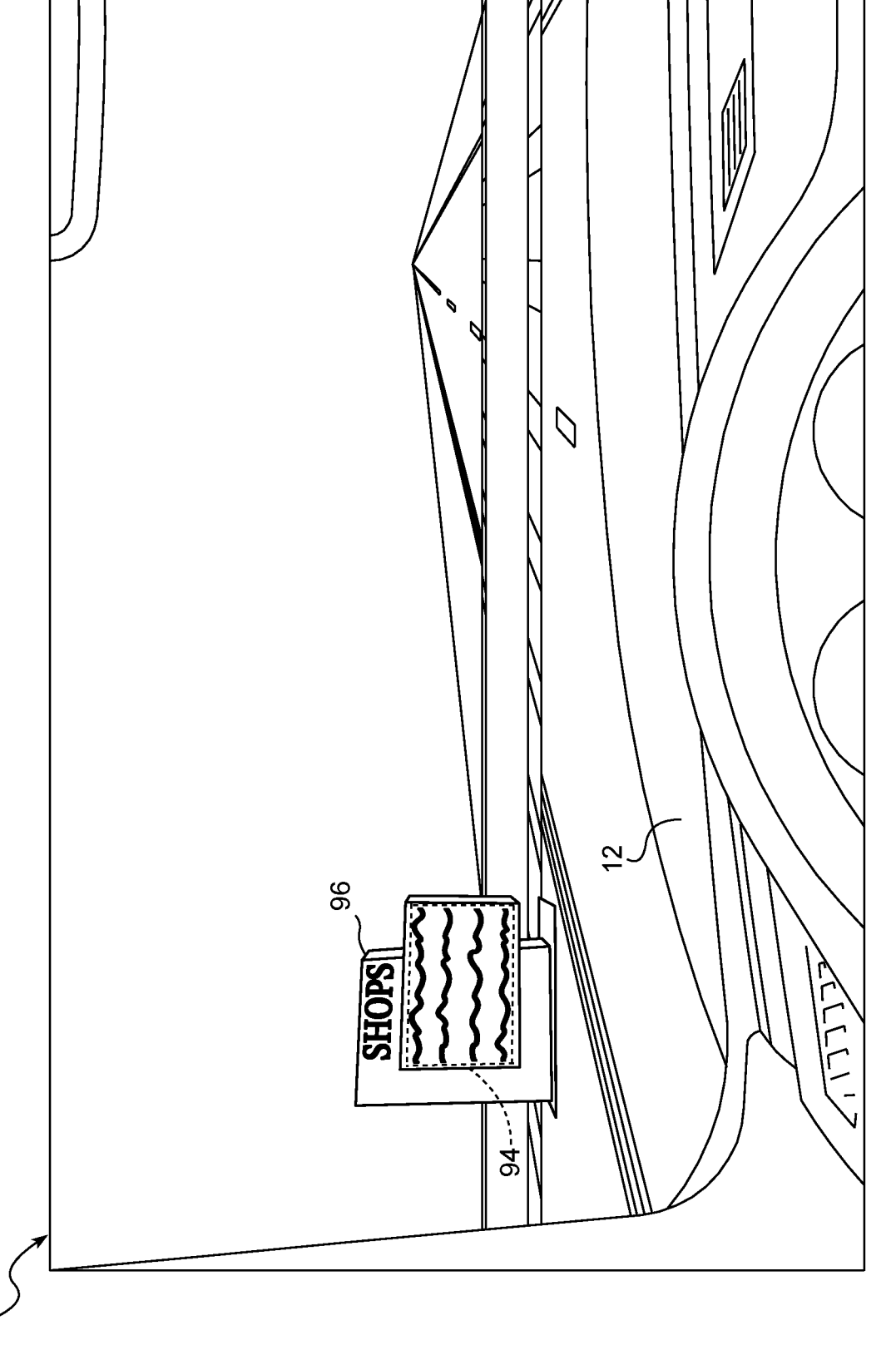
FIG. 7 is a second exemplary view through the windscreen of the vehicle, according to an exemplary embodiment.

Referring to FIG. 7, a second exemplary view 90*b* through the windscreen 42 of the vehicle 12 is shown. The second exemplary view 90*b* includes a second exemplary graphic 94. In a non-limiting example, the second exemplary graphic 94 is overlayed upon an existing roadside sign 96. For example, the second exemplary graphic 94 may provide information customized to preferences of the occupant 44 about the POI location, such as, for example, a re-ordered display of business names present on the roadside sign 96 based on preferences of the occupant 44. In an exemplary embodiment, the plurality of vehicle sensors 16 are used to determine factors such as, for example, gender, age, and/or the like in order to infer preferences of the occupant 44. In another exemplary embodiment, the plurality of vehicle sensors 16 are used to determine a purpose of the vehicle trip (e.g., recreational, business, shopping, and/or the like) based on the occupants of the vehicle.

It should be understood that the system 10 and method 100 are applicable to display additional information, such as, for example, opening hours of POIs, special events at POIs, information about yard sales, and/or the like. It should also be understood that the plurality of vehicle sensors 16 may be used to perceive information about the environment 40 and provide additional context. For example, the plurality of vehicle sensors 16 may be used to identify objects, such as, for example, vehicles, in the environment 40 and the system 10 and method 100 may be used to provide information about the identified objects to the occupant 44. Furthermore, it should be understood that the system 10 and method 100 are additionally applicable to displaying graphics on other windows of the vehicle 12, such as, for example, a side window, a rear window, a rear windscreen, and/or the like.

Referring again to FIG. 5, at block 110, the vehicle controller 14 determines a gaze direction of the occupant 44. The gaze direction includes one of: a graphic gaze direction and a non-graphic gaze direction. In the scope of the present disclosure, the graphic gaze direction means that the occupant 44 is determined to be looking at the graphic displayed at block 108. The non-graphic gaze direction means that the occupant 44 is determined not to be looking at the graphic displayed at block 108 (i.e., the occupant 44 is determined to be looking at anything other than the graphic displayed at block 108). In an exemplary embodiment, the gaze direction is determined using the occupant position tracking device 50. If the gaze direction is determined to be the non-graphic gaze direction, the method 100 proceeds to enter a standby state at block 112. If the gaze direction is determined to be the graphic gaze direction, the method 100 proceeds to block 114.

At block 114, the vehicle controller 14 determines a gaze time of the occupant 44 in response to determining that the gaze direction determined at block 110 is the graphic gaze direction. In the scope of the present disclosure, the gaze time is a length of time for which the occupant 44 has been looking at the graphic displayed at block 108. If the gaze time is less than a predetermined gaze time threshold (e.g., two seconds), the method 100 returns to block 110. If the gaze time is greater than or equal to the predetermined gaze time threshold, the method 100 proceeds to block 116.

At block 116, the vehicle controller 14 determines an impression metric. In the scope of the present disclosure, the impression metric is a binary true or false value which quantifies whether the graphic displayed at block 108 made an impression on the occupant 44 (i.e., whether the occupant 44 saw, read, and understood the graphic). The impression metric is a type of engagement metric. In the scope of the present disclosure, the engagement metric quantifies a level of engagement of the occupant 44 with the graphic displayed at block 108. The engagement metric may include additional components in addition to the impression metric, as will be discussed in greater detail below. In an exemplary embodiment, at block 116, the impression metric is determined to be true in response to determining that the gaze time is greater than or equal to the predetermined gaze time threshold. Furthermore, the impression metric is transmitted to the remote server system 80 using the vehicle communication system 36. After block 116, the method 100 proceeds to block 118.

At block 118, the vehicle controller 14 determines whether a predetermined time (e.g., two days) has elapsed since the graphic was displayed at block 108. If the predetermined time has elapsed since the graphic was displayed, the method 100 proceeds to enter the standby state at block 112. If the predetermined time has not elapsed since the graphic was displayed, the method 100 proceeds to block 120.

At block 120, determines the location of the vehicle 12 using the GNSS 38 and transmits the location of the vehicle 12 to the remote server system 80 using the vehicle communication system 36. After block 120, the method 100 proceeds to block 122.

At block 122, the server communication system 86 receives the location of the vehicle 12 transmitted at block 120 and compares the location of the vehicle 12 to the POI location of the first of the plurality of database records in the server database 84 identified at block 106. If the location of the vehicle 12 is not within the POI location of the first of the plurality of database records, the method 100 returns to block 118. If the location of the vehicle 12 is within the POI location of the first of the plurality of database records, the method 100 proceeds to block 124.

At block 124, the server controller 82 determines a closure metric. In the scope of the present disclosure, the closure metric is a binary true or false value which quantifies whether the graphic displayed at block 108 influenced the behavior of the occupant 44 (i.e., whether the occupant 44 changed their behavior based on the graphic). The closure metric is a type of engagement metric. Therefore, in the scope of the present disclosure, the engagement metric may include one or both of the impression metric and/or the closure metric. In an exemplary embodiment, at block 124, the closure metric is determined to be true in response to determining that the vehicle 12 visited the POI location within the predetermined time. After block 124, the method 100 proceeds to enter the standby state at block 112.

In an exemplary embodiment, the engagement metrics (i.e., the impression metric and the closure metric) are saved in the server database 84 and linked to the first of the plurality of database records. In a non-limiting example, the engagement metrics are later retrieved for analysis of an effectiveness of the graphic and/or for transmission to interested parties (e.g., operators of POIs).

In an exemplary embodiment, the vehicle controller 14 repeatedly exits the standby state 112 and restarts the method 100 at any stage of the method 100, including, for example, blocks 102, 110, or 118. In a non-limiting example, the vehicle controller 14 exits the standby state 112 and restarts the method 100 on a timer, for example, every three hundred milliseconds.

The system 10 and method 100 of the present disclosure offer several advantages. For example, the system 10 and method 100 allow for increased occupant awareness of POIs in the environment 40, increasing occupant convenience. By providing current information about POIs, the system 10 and method 100 inform occupants with relevant information. By tracking the engagement metrics (i.e., the impression metric and the closure metric), interested parties (e.g., operators of POIs) may quantify and evaluate effectiveness of graphics for informing occupants. The remote server system 80 may transmit the engagement metrics to the interested parties. Additionally, by customizing the graphics to the preferences of the occupants, the engagement metrics may be improved. Use of the display system including the AR-HUD 18 and the TWD system 20 allow occupants to receive information from the system 10 and method 100 while maintaining focus on the roadway ahead.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing information to an occupant of a vehicle, the system comprising:
   a global navigation satellite system (GNSS);
   a vehicle communication system;
   a display system configured to provide information to the occupant of the vehicle, wherein the display system includes an augmented reality head-up display (AR-HUD) system, wherein the AR-HUD system includes an occupant position tracking device and an AR-HUD projector, and wherein the AR-HUD system includes a first image plane showing a view of an outside world and a second image plane for displaying graphics; and
   a vehicle controller in electrical communication with the GNSS, the vehicle communication system, and the display system, wherein the vehicle controller is programmed to:
      determine a location of the vehicle using the GNSS;
      transmit the location of the vehicle to a remote server system using the vehicle communication system;
      receive a graphic from the remote server system;
      determine a position of the occupant using the occupant position tracking device;
      calculate a size, shape, and location of the graphic based on the position of the occupant;
      display the graphic on a windscreen of the vehicle in the second image plane using the augmented reality head up display system based on the size, shape, and location; and
      transmit an impression metric of the graphic to the remote server system using the vehicle communication system, wherein the impression metric quantifies whether the graphic made an impression on the occupant; and
   wherein the remote server system includes a server communication system and a server database in electrical communication with a server controller, wherein the server database includes a plurality of database records, wherein each of the plurality of database records includes a graphic display location, a point-of-interest (POI) location, and a POI graphic, and wherein the server controller is programmed to:
      receive the location of the vehicle using the server communication system;
      select a first of the plurality of database records, wherein the location of the vehicle is within the graphic display location of the first of the plurality of database records;
      select the graphic, wherein the graphic is the POI graphic from the first of the plurality of database records;
      transmit the graphic to the vehicle communication system using the server communication system;

receive the impression metric using the server communication system and store the impression metric in the server database;

compare the location of the vehicle to the POI location of the first of the plurality of database records in response to determining that the impression metric is true;

determine an elapsed time since the graphic was displayed; and determine a closure metric to be true only if the location of the vehicle is within the POI location of the first of the plurality of database records, the impression metric is true, and the elapsed time is less than or equal to a predetermined time, wherein the closure metric quantifies whether the graphic influenced a behavior of the occupant.

2. The system of claim 1, further including an occupant position tracking device in electrical communication with the vehicle controller, wherein to transmit the impression metric, the vehicle controller is further programmed to:

determine a gaze direction of the occupant using the occupant position tracking device, wherein the gaze direction includes one of: a graphic gaze direction and a non-graphic gaze direction, wherein the graphic gaze direction means that the occupant is looking at the graphic displayed on the AR-HUD;

determine the impression metric based at least in part on the gaze direction of the occupant; and transmit the impression metric of the graphic to the remote server system using the vehicle communication system.

3. The system of claim 1, wherein the display system further includes a transparent windscreen display (TWD) system in electrical communication with the vehicle controller, wherein the transparent windscreen display system includes transparent phosphors embedded in the windscreen of the vehicle and a TWD projector, and wherein to display the graphic, the vehicle controller is further programmed to:

determine a position of the occupant using the occupant position tracking device;

calculate a size, shape, and location of the graphic based on the position of the occupant; and display the graphic on the windscreen of the vehicle using the TWD system based on the size, shape, and location.

4. The system of claim 2, wherein to determine the impression metric based at least in part on the gaze direction of the occupant, the vehicle controller is further programmed to:

determine a gaze time of the occupant in response to determining that the gaze direction is the graphic gaze direction, wherein the gaze time is a length of time for which the occupant is looking at the graphic displayed on the AR-HUD;

compare the gaze time of the occupant to a predetermined gaze time threshold;

determine the impression metric to be true in response to determining that the gaze time of the occupant is greater than or equal to the predetermined gaze time threshold; and determine the impression metric to be false in response to determining that the gaze time of the occupant is less than the predetermined gaze time threshold.

5. A method for providing information to an occupant of a vehicle, the method comprising:

determining a location of the vehicle using a global navigation satellite system (GNSS);

selecting a first of a plurality of database records based on the location of the vehicle, wherein each of the plurality of database records includes a graphic display location, a point-of-interest (POI) location, and a POI graphic, wherein the graphic display location is a geofenced area, wherein the POI graphic is a graphic to be displayed when the vehicle is within the graphic display location, and wherein the location of the vehicle is within the graphic display location of the first of the plurality of database records;

determining a graphic, wherein the graphic is the POI graphic from the first of the plurality of database records;

displaying the graphic using a display system;

determining an impression metric based at least in part on a gaze direction of the occupant relative to the graphic, wherein determining the impression metric further comprises:

determining the gaze direction of the occupant using an occupant position tracking device, wherein the gaze direction includes one of: a graphic gaze direction and a non-graphic gaze direction;

determining a gaze time of the occupant in response to determining that the gaze direction is the graphic gaze direction;

comparing the gaze time of the occupant to a predetermined gaze time threshold;

determining the impression metric to be true in response to determining that the gaze time of the occupant is greater than or equal to the predetermined gaze time threshold; and determining the impression metric to be false in response to determining that the gaze time of the occupant is less than the predetermined gaze time threshold; and determining a closure metric based at least in part on the impression metric, the location of the vehicle, and the POI location of the first of the plurality of database records, wherein the closure metric is a binary true or false value, and wherein determining the closure metric further comprises:

determining an elapsed time since the graphic was displayed;

comparing the location of the vehicle to the POI location of the first of the plurality of database records; and determining the closure metric to be true in response to determining that the impression metric is true, the location of the vehicle is within the POI location of the first of the plurality of database records, and the elapsed time is less than or equal to a predetermined time.

6. The method of claim 5, wherein the display system includes an augmented reality head-up display (AR-HUD) system, wherein the AR-HUD system includes an occupant position tracking device and an AR-HUD projector, and wherein displaying the graphic further comprises:

determining a position of the occupant using the occupant position tracking device;

calculating a size, shape, and location of the graphic based on the position of the occupant; and displaying the graphic on a windscreen of the vehicle using the augmented reality head up display system based on the size, shape, and location.

7. The method of claim 6, wherein the display system further includes a transparent windscreen display (TWD) system, wherein the transparent windscreen display system includes transparent phosphors embedded in the windscreen of the vehicle and a TWD projector, and wherein displaying the graphic further comprises:

displaying the graphic on the windscreen of the vehicle using the TWD system based on the size, shape, and location.

8. A system for providing information to an occupant of a vehicle, the system comprising:

a global navigation satellite system (GNSS);

a vehicle communication system;

a display system configured to provide information to the occupant of the vehicle, wherein the display system includes an augmented reality head-up display (AR-HUD) system, wherein the AR-HUD system includes an occupant position tracking device and an AR-HUD projector, and wherein the AR-HUD system includes a first image plane showing a view of an outside world and a second image plane for displaying graphics, wherein the second image plane spans multiple lanes and begins at a first predetermined distance from the vehicle and ends at a second predetermined distance greater than the first predetermined distance; and a vehicle controller in electrical communication with the GNSS, the vehicle communication system, and the display system, wherein the vehicle controller is programmed to:

determine a location of the vehicle using the GNSS;

transmit the location of the vehicle to a remote server system using the vehicle communication system;

receive a graphic from the remote server system;

determine a position of the occupant using the occupant position tracking device;

calculate a size, shape, and location of the graphic based on the position of the occupant;

display the graphic on a windscreen of the vehicle in the second image plane using the augmented reality head up display system based on the size, shape, and location; and transmit an impression metric of the graphic to the remote server system using the vehicle communication system, wherein the impression metric quantifies whether the graphic made an impression on the occupant; and wherein the remote server system includes a server communication system and a server database in electrical communication with a server controller, wherein the server database includes a plurality of database records, wherein each of the plurality of database records includes a graphic display location, a point-of-interest (POI) location, and a POI graphic, wherein the graphic display location is a geofenced area, wherein the POI graphic is a graphic to be displayed when the vehicle is within the graphic display location, and wherein the server controller is programmed to:

receive the location of the vehicle using the server communication system;

select a first of the plurality of database records, wherein the location of the vehicle is within the graphic display location of the first of the plurality of database records;

select the graphic, wherein the graphic is the POI graphic from the first of the plurality of database records;

transmit the graphic to the vehicle communication system using the server communication system;

receive the impression metric using the server communication system and store the impression metric in the server database;

compare the location of the vehicle to the POI location of the first of the plurality of database records in response to determining that the impression metric is true;

determine an elapsed time since the graphic was displayed; and determine a closure metric to be true only if the location of the vehicle is within the POI location of the first of the plurality of database records, the impression metric is true, and the elapsed time is less than or equal to a predetermined time, wherein the closure metric quantifies whether the graphic influenced a behavior of the occupant.

9. The system of claim 8, wherein to transmit the impression metric, the vehicle controller is further programmed to:

determine a gaze direction of the occupant using the occupant position tracking device, wherein the gaze direction includes one of: a graphic gaze direction and a non-graphic gaze direction, wherein the graphic gaze direction means that the gaze direction of the occupant intersects the location of the graphic in the second image plane, and wherein the non-graphic gaze direction means that the gaze direction of the occupant intersects with the first image plane;

determine a gaze time of the occupant in response to determining that the gaze direction is the graphic gaze direction;

compare the gaze time of the occupant to a predetermined gaze time threshold;

determine the impression metric to be true in response to determining that the gaze time of the occupant is greater than or equal to the predetermined gaze time threshold;

determine the impression metric to be false in response to determining that the gaze time of the occupant is less than the predetermined gaze time threshold; and transmit the impression metric to the remote server system using the vehicle communication system.

* * * * *